(12) United States Patent
Hua et al.

(10) Patent No.: US 8,196,032 B2
(45) Date of Patent: Jun. 5, 2012

(54) TEMPLATE-BASED MULTIMEDIA AUTHORING AND SHARING

(75) Inventors: Xian-Sheng Hua, Beijing (CN); Shipeng Li, Remond, WA (US)

(73) Assignee: Microsoft Corporation, Redmond, WA (US)

( * ) Notice: Subject to any disclaimer, the term of this patent is extended or adjusted under 35 U.S.C. 154(b) by 1163 days.

(21) Appl. No.: 11/263,718

(22) Filed: Nov. 1, 2005

(65) Prior Publication Data

US 2007/0101271 A1 May 3, 2007

(51) Int. Cl.
*G06F 17/00* (2006.01)
*G06F 3/00* (2006.01)

(52) U.S. Cl. ........ 715/202; 715/200; 715/203; 715/234; 715/223; 715/224; 715/225; 715/226; 715/231

(58) Field of Classification Search .................. 715/731, 715/200, 202–203, 234, 723–726
See application file for complete search history.

(56) References Cited

U.S. PATENT DOCUMENTS

| | | | |
|---|---|---|---|
| 5,333,091 A | 7/1994 | Iggulden et al. |
| 5,497,430 A | 3/1996 | Sadovnik et al. |
| 5,710,560 A | 1/1998 | Cohn |
| 5,778,137 A | 7/1998 | Nielsen et al. |
| 5,821,945 A | 10/1998 | Yeo et al. |
| 5,884,056 A | 3/1999 | Steele |
| 5,884,058 A | 3/1999 | Narayan et al. |
| 5,901,245 A | 5/1999 | Warnick et al. |
| 5,952,993 A | 9/1999 | Matsuda et al. |
| 5,956,026 A | 9/1999 | Ratakonda |
| 5,966,126 A | 10/1999 | Szabo |
| 5,983,273 A | 11/1999 | White et al. |
| 6,020,901 A | 2/2000 | Lavelle et al. |
| 6,047,085 A | 4/2000 | Sato et al. |
| 6,072,496 A | 6/2000 | Guenter et al. |
| 6,100,941 A | 8/2000 | Dimitrova et al. |
| 6,166,735 A | 12/2000 | Dom et al. |
| 6,168,273 B1 | 1/2001 | Dupraz et al. |
| 6,182,133 B1 | 1/2001 | Horvitz |
| 6,232,974 B1 | 5/2001 | Horvitz et al. |
| 6,236,395 B1 | 5/2001 | Sezan et al. |
| 6,282,317 B1 | 8/2001 | Luo et al. |
| 6,292,589 B1 | 9/2001 | Chow et al. |

(Continued)

FOREIGN PATENT DOCUMENTS

EP 1478181 A1 11/2004

(Continued)

OTHER PUBLICATIONS

Padmanabhan et al., "Resilient Peer to Peer Streaming", <<http://eprints.kfupm.edu.sa/62381.pdf>>, Mar. 2003, 17 pages.

(Continued)

*Primary Examiner* — Chau Nguyen
(74) *Attorney, Agent, or Firm* — Lee & Hayes, PLLC

(57) ABSTRACT

Systems and methods for template-based multimedia authoring and sharing are described. In one aspect, media content is selectively applied to a content description template to author media in a content description. The content description template provides a temporal structure for the applied media content. A content representation template is selected and combined with the temporally structured media in the content description to specify rendering criteria and generate a content description and representation for one or more of rendering, sharing, and exporting the temporally structured authored media.

20 Claims, 9 Drawing Sheets

U.S. PATENT DOCUMENTS

| | | | |
|---|---|---|---|
| 6,298,145 B1 | 10/2001 | Zhang et al. | |
| 6,307,550 B1 | 10/2001 | Chen et al. | |
| 6,332,163 B1 | 12/2001 | Bowman-Amuah | |
| 6,353,824 B1 | 3/2002 | Boguraev et al. | |
| 6,389,168 B2 | 5/2002 | Altunbasak et al. | |
| 6,404,925 B1 | 6/2002 | Foote et al. | |
| 6,408,128 B1 | 6/2002 | Abecassis | |
| 6,421,675 B1 | 7/2002 | Ryan et al. | |
| 6,449,251 B1 | 9/2002 | Awadallah et al. | |
| 6,466,702 B1 | 10/2002 | Atkins et al. | |
| 6,473,778 B1 | 10/2002 | Gibbon | |
| 6,516,090 B1 | 2/2003 | Lennon et al. | |
| 6,581,096 B1 | 6/2003 | Cottrille et al. | |
| 6,616,700 B1 | 9/2003 | Thum et al. | |
| 6,622,134 B1 | 9/2003 | Sorkin | |
| 6,631,403 B1 | 10/2003 | Deutsch et al. | |
| 6,643,643 B1 | 11/2003 | Lee et al. | |
| 6,643,665 B2 | 11/2003 | Kimbell et al. | |
| 6,658,059 B1 | 12/2003 | Iu et al. | |
| 6,661,468 B2 | 12/2003 | Alten et al. | |
| 6,670,963 B2 | 12/2003 | Osberger | |
| 6,711,587 B1 | 3/2004 | Dufaux | |
| 6,714,909 B1 | 3/2004 | Gibbon et al. | |
| 6,721,454 B1 | 4/2004 | Qian et al. | |
| 6,773,778 B2 | 8/2004 | Onozawa et al. | |
| 6,792,144 B1 | 9/2004 | Yan et al. | |
| 6,807,361 B1 | 10/2004 | Girgensohn et al. | |
| 6,870,956 B2 | 3/2005 | Qi et al. | |
| 6,934,415 B2 | 8/2005 | Stentiford | |
| 6,938,268 B1* | 8/2005 | Hodge | 725/93 |
| 6,956,573 B1 | 10/2005 | Bergen et al. | |
| 7,006,091 B2 | 2/2006 | Masera et al. | |
| 7,055,166 B1 | 5/2006 | Logan et al. | |
| 7,062,705 B1 | 6/2006 | Kirkwood et al. | |
| 7,065,707 B2 | 6/2006 | Chen et al. | |
| 7,069,310 B1* | 6/2006 | Bartholomew | 709/219 |
| 7,072,984 B1 | 7/2006 | Polonsky et al. | |
| 7,095,907 B1 | 8/2006 | Berkner et al. | |
| 7,116,716 B2 | 10/2006 | Ma et al. | |
| 7,248,294 B2 | 7/2007 | Slatter | |
| 7,296,168 B2 | 11/2007 | Edwards | |
| 7,325,199 B1* | 1/2008 | Reid | 715/723 |
| 7,356,464 B2 | 4/2008 | Stella et al. | |
| 7,546,544 B1* | 6/2009 | Weber et al. | 715/769 |
| 7,603,626 B2* | 10/2009 | Williams et al. | 715/201 |
| 7,639,882 B2 | 12/2009 | Itakura | |
| 7,826,709 B2* | 11/2010 | Moriya et al. | 715/202 |
| 2001/0023450 A1 | 9/2001 | Chu | |
| 2001/0047355 A1 | 11/2001 | Anwar | |
| 2002/0037159 A1 | 3/2002 | Goto et al. | |
| 2002/0067376 A1 | 6/2002 | Martin et al. | |
| 2002/0069218 A1 | 6/2002 | Sull et al. | |
| 2002/0073218 A1 | 6/2002 | Aspromonte et al. | |
| 2002/0100052 A1 | 7/2002 | Daniels | |
| 2002/0116533 A1 | 8/2002 | Holliman et al. | |
| 2002/0154833 A1 | 10/2002 | Koch et al. | |
| 2002/0166123 A1 | 11/2002 | Schrader et al. | |
| 2002/0191861 A1 | 12/2002 | Cheatle | |
| 2003/0033347 A1 | 2/2003 | Bolle et al. | |
| 2003/0115607 A1 | 6/2003 | Morioka et al. | |
| 2003/0123850 A1 | 7/2003 | Jun et al. | |
| 2003/0195863 A1* | 10/2003 | Marsh | 707/1 |
| 2003/0206656 A1 | 11/2003 | Schwartz et al. | |
| 2003/0210886 A1 | 11/2003 | Li et al. | |
| 2003/0237053 A1 | 12/2003 | Chen et al. | |
| 2004/0001106 A1* | 1/2004 | Deutscher et al. | 345/838 |
| 2004/0039755 A1* | 2/2004 | Kunze | 707/104.1 |
| 2004/0039810 A1 | 2/2004 | Donescu et al. | |
| 2004/0040041 A1 | 2/2004 | Crawford | |
| 2004/0068481 A1 | 4/2004 | Seshadri et al. | |
| 2004/0071083 A1 | 4/2004 | Li et al. | |
| 2004/0078357 A1 | 4/2004 | LaChapelle et al. | |
| 2004/0078382 A1 | 4/2004 | Mercer et al. | |
| 2004/0078383 A1 | 4/2004 | Mercer et al. | |
| 2004/0085341 A1 | 5/2004 | Hua et al. | |
| 2004/0088726 A1 | 5/2004 | Ma et al. | |
| 2004/0125877 A1 | 7/2004 | Chang et al. | |
| 2004/0128317 A1 | 7/2004 | Sull et al. | |
| 2004/0165784 A1 | 8/2004 | Xie et al. | |
| 2004/0184776 A1 | 9/2004 | Inoue et al. | |
| 2004/0236863 A1 | 11/2004 | Shen et al. | |
| 2004/0267952 A1 | 12/2004 | He et al. | |
| 2005/0069225 A1* | 3/2005 | Schneider et al. | 382/305 |
| 2005/0084232 A1* | 4/2005 | Herberger et al. | 386/4 |
| 2005/0114434 A1* | 5/2005 | Yang et al. | 709/201 |
| 2005/0114784 A1* | 5/2005 | Spring et al. | 715/762 |
| 2005/0162556 A1* | 7/2005 | Desai | 348/564 |
| 2005/0169312 A1 | 8/2005 | Cakareski et al. | |
| 2005/0175001 A1 | 8/2005 | Becker Hof et al. | |
| 2005/0192987 A1* | 9/2005 | Marsh | 707/100 |
| 2005/0207442 A1* | 9/2005 | Zoest et al. | 370/465 |
| 2005/0257151 A1* | 11/2005 | Wu | 715/716 |
| 2005/0262439 A1* | 11/2005 | Cameron | 715/523 |
| 2006/0023748 A1 | 2/2006 | Chandhok et al. | |
| 2006/0026528 A1* | 2/2006 | Paulsen et al. | 715/776 |
| 2006/0036759 A1* | 2/2006 | Shen et al. | 709/234 |
| 2006/0074754 A1 | 4/2006 | Toyohara et al. | |
| 2006/0107209 A1* | 5/2006 | Chen et al. | 715/530 |
| 2006/0123053 A1 | 6/2006 | Scannell, Jr. | |
| 2006/0179054 A1* | 8/2006 | Levi | 707/6 |
| 2006/0190435 A1 | 8/2006 | Heidloff et al. | |
| 2006/0190615 A1 | 8/2006 | Panwar et al. | |
| 2006/0200442 A1 | 9/2006 | Parikh | |
| 2006/0239644 A1 | 10/2006 | Barbieri | |
| 2007/0027754 A1 | 2/2007 | Collins et al. | |
| 2007/0060099 A1 | 3/2007 | Ramer et al. | |
| 2007/0101387 A1* | 5/2007 | Hua et al. | 725/113 |
| 2007/0201558 A1* | 8/2007 | Xu et al. | 375/240.22 |
| 2008/0065751 A1 | 3/2008 | Hampson | |

FOREIGN PATENT DOCUMENTS

| | | |
|---|---|---|
| JP | 2000516435 | 12/2000 |
| JP | 2001184802 A | 7/2001 |
| JP | 2002125199 A | 4/2002 |
| JP | 2002223412 | 8/2002 |
| JP | 2002238027 | 8/2002 |
| KR | 20020009089 A | 2/2002 |
| KR | 20040042449 A | 5/2004 |
| WO | W09855943 | 12/1998 |
| WO | WO0028467 A1 | 5/2000 |

OTHER PUBLICATIONS

Ex parte Douglas K. Brubacher and Luciano Passuello, Board Patent Appeals and Interference, Decided on Jan. 22, 2009, 14 pages.

Uchihashi et al., "Video Manga: Generating Semantically Meaningful Video Summaries", in Proceedings of the Seventh ACM International Conference on Multimedia, Orland Florida, Oct. 30-Nov. 5, 1999, ACM, pp. 383-392.

Jiang et al., "GnuStream: A P2P Media Streaming System Prototype", 2003 International Conference on Multimedia and Expo, vol. 2, 5 pages.

Wang, "Design and Realization of User Model of Personalized Information Retrieval", Masteral Dissertation, Dalian University of Science and Technology, Dec. 15, 2004.

Final Office Action for U.S. Appl. No. 11/278,487, mailed on Jun. 16,2011, Yu-Fei Ma, "Generating a Motion Attention Model".

Japanese Office Action mailed Sep. 1, 2011 for Japanese patent application No. 2005-224585, a counterpart foreign application of US patent No. 7,986,372, 2 pages.

Non-Final Office Action for U.S. Appl. No. 11/279,793, mailed by Sep. 15, 2011, Xian-Sheng Hua, "Media Sharing and Authoring on the Web", 21 pages.

Final Office Action for U.S. Appl. No. 10/900,923, mailed on Sep. 22, 2011, Aaron DeYonker, "Thumbnail Generation and Presentation for Recorded TV Programs", 21 pages.

Bennett et al., "Proscenium: A Framework for Spatio-Ternparal Video Editing", Nov. 2-8, 2003, 8 pages.

Foote. et al., "Creating Music Videos using Automatic Media Analysis", 8 pages, 2002.

Girgensogn, et al., "A Semi-automatic Approach to Home Video Editing", U IST 2000, San Diego, CA, 9 pages.

Girgensogn, at al., "Home Video Editing Made Easy—Balancing Automation and User Control", 8 pages, 2001.

Goncalves, "Towards a Learning Model for Feature Integration in Attention Control", retrieved on Jul. 19, 2006 at <<http://ieeexplore.Ieee.org/search/srchabstract.jsp?arnumber=1013553 &Isnumber=21824&pun>>, International Conference on Multisensor Fusion and Integration for Intelligent Systems, Aug. 20-22, 2001, pp. 311-316.

Graham, et al., "The Video Paper Multimedia Playback System", Nov. 2-8, 2003, 2 pages.

Hua, et al., "Automatically Converting Photographic Series into Video", Oct. 10-16, 2004, 8 pages.

Hua, et al., "AVE—Automated Home Video Editing", Nov. 2-8, 2003, 8 pages.

Hua, et al., "Video Booklet", 4 pages, 2005.

Ma, et al., "A User Attention Model for Video Summarization", Dec. 2002, 10 pages.

Osberger, et al., "An Automatic Image Quality Assessment Technique Incorporating Higher Level Perceptual Factors", retrieved on Jul. 19, 2006, at <<http://ieeexplore.ieee.org/search/srchabstract.jsp?arnumber727227&isnumber==15680&punu>>, International Conference on Image Processing, vol. 3, Oct. 4-7, 1998, pp. 414-418.

Yip, et al., "The Automatic Video Editor", Nov. 2-8, 2003, Berkeley, California, 2 pages.

Beg, "User Feedback Based Enchancement in Web Search Quality", Elsevier Inc., 2004, pp. 20.

Degn, et al., "Peer Group Filtering and Perceptual Color Image Quantization", IEEE, 1999, pp. 8.

Kelly, et al., "Implicit Feedback for Inferring User Preference: A Bibliography", SIGIR FORUM, vol. 37, No. 2, 2003, pp. 18-28.

"NOMAD (No More Advertising)", http://www.fatalfx.com/nomad/, Feb. 17 2003 4 pages.

Pirolli, "Exploring Browser Design Trade-offs Using a Dynamical Model of Optimal Information Foraging", Proc. SIGHI Conference on Human factors in Computing Systems CHI, 1998, pp. 33-40.

Smith, et al., "Scalable Multimedia Delivery for Pervasive Computing", ACM, 1999, pp. 131-140.

Sugiyama, et al., "Adaptive Web Search Based on User s Implicit Preference", DEWS, 2004, pp. 8.

Li, "PeerStreaming a Practical P2P Streaming System", Microsoft, Sep. 2004.

Vetro, et al., "Object-Based Transcoding for Adaptable Video Content Delivery", Transactions on Circuits and Systems for Video Technology, IEEE, vol. 11, No. 3, Mar. 2001, pp. 387-401.

Wolf, "Key Frame Selection by Motion Analysis", Conf. Proceedings Acoustics, Speech, and Signal Processing, 1996 IEEE International Conference, May 1996, vol. 2, pp. 1228-1231.

Zhuang et al., "Adaptive Key Frame Extraction Using Unsupervised Clustering", Oct. 1998 in IEEE International Conference on Image Processing, vol. 1, pp. 866-870.

Adams, et al., "Seeded Region Growing", IEEE, vol. 16, No. 6, 1994, pp. 641-648.

Alexander, et al., "Informedia: News-on-Demand Multimedia Information Acquisition and Retrieval", 1997, pp. 1-21.

DeMenthon, et al., "Video Summarization by Curve Simplification", ACM, 1998, pp. 211-218.

Gong, et al., "Creating Motion Video Summaries with Partial Audio-Visual Alignment", IEEE, 2002, pp. 285-288.

Fan, et al., "Visual Attention Based Image Browsing on Mobile Devices", 4 pages, 2003.

Dufaux, "Key frame selection to represent a video", Proc. 2000 Int. Con. on Image Processing, vol. 2, Sep. 2000, pp. 275-278.

Rauschenbach, et al., "Demand-driven image transmission with levels of detail and regions of interest", Computers & Graphics, 1999, pp. 857-866.

Rauschenbach, et al., "Flexible Embedded Image Communication using Levels of Detail and Regions of Interest", Proc. IMC'98, 1998, pp. 1-10.

Notice of Rejection for Japanese Patent Application No. 2003-375014, mailed on Sep. 10, 2008, 10 pgs.

* cited by examiner

CDT: *Content Description Template*
CRT: *Content Representation Template*
CDF: *Content Description File*
CDRF: *Content Description and Representation File*

300

MSegs in CDT

| Leader | Introduction (Photos of previous years) |
| Chapter 1 | Guest Arriving and Greeting |
| Chapter 2 | The Party |
|     Scene 1 | Candles and Song |
|     Scene 2 | Eating Cake |
|     Scene 3 | Giving and Opening Gifts |
| Chapter 3 | Guests Leaving and Giving Favor |
| Chapter 4 | Final Words of the Birthday Child |
| Tail | Closing (Summary) |

Result Timeline

500

| L | C1 | C2 ||| C3 | C4 | T |
|---|----|------|------|------|----|----|---|
|   |    | C2S1 | C2S2 | C2S3 |    |    |   |

*Fig. 5*

TEMPLATE-BASED MULTIMEDIA AUTHORING AND SHARING

BACKGROUND

The rapid adoption of digital cameras and camcorders has resulted in explosive growth of personal photos and home video in digital form. There is a huge demand for new tools and systems to enable an average user to efficiently and effectively process, manage, author and share digital media contents. Although video authoring tools exist, video authoring remains as a tedious and extremely time consuming task that often requires trained professional skills. Thus, a powerful multimedia authoring tool to substantially reduce a users' efforts in editing home video, images, etc. would be very useful.

SUMMARY

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

In view of the above, template-based multimedia authoring and sharing is described. In one aspect, media content is selectively applied to a content description template to author media in a content description. The content description template provides a temporal structure for the applied media content. A content representation template is selected and combined with the temporally structured media in the content description to specify rendering criteria and generate a content description and representation for one or more of rendering, sharing, and exporting the temporally structured authored media

BRIEF DESCRIPTION OF THE DRAWINGS

In the Figures, the left-most digit of a component reference number identifies the particular Figure in which the component first appears.

FIG. 5 shows an exemplary layout of a user interface rendered by a CDT user interface engine, according to one embodiment.

DETAILED DESCRIPTION

Overview

The systems (e.g., systems, apparatus, computer-readable media, means, etc.) and methods for template-based multimedia authoring and sharing, as described below in reference to FIGS. 1 through 11, implement media content analysis and allow for selective application of content-aware two-layer authoring templates (i.e., content description templates and content representation templates) to extracted media content. With two layers of authoring templates, the systems and methods separate video authoring operations from video representation. Once multimedia content such as video has been authored (i.e., generated), the authored content is simply and flexibly represented in one or more other forms, according to user preference. The systems and methods provide an open and extensible multimedia authoring and sharing framework that supports dynamic update of core components such as content analysis algorithms, editing methods, and the two-layer authoring templates. These aspects significantly reduce user efforts in video editing, as compared to conventional multimedia authoring systems and techniques, while preserving flexibility and personalization These and other aspects of the systems and methods for template-based multimedia authoring and sharing are now described in greater detail.

An Exemplary System

Although not required, the systems and methods for template-based multimedia authoring and sharing are described in the general context of computer-executable instructions (program modules) being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 1:
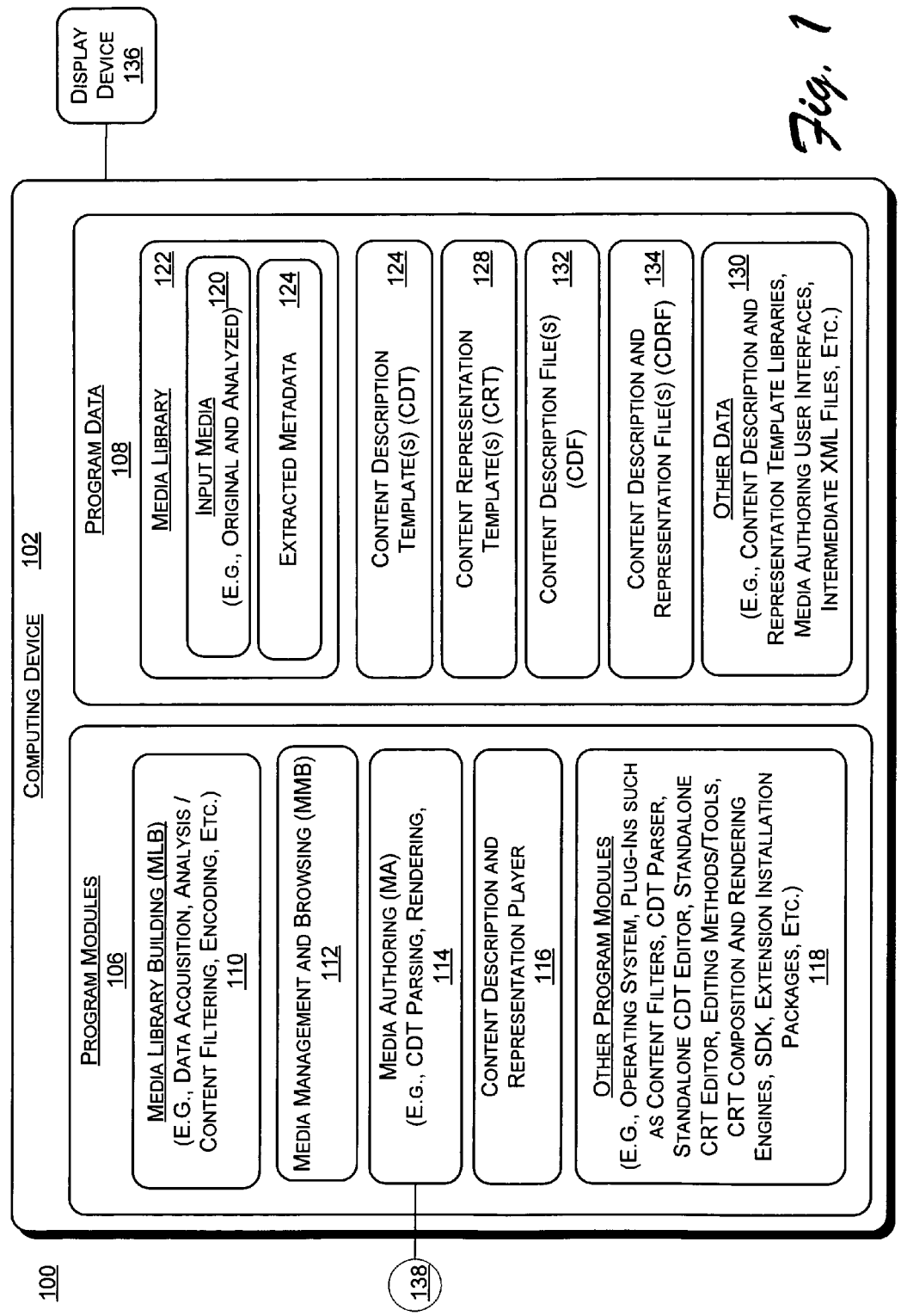
FIG. 1 illustrates an exemplary system for template-based multimedia authoring and sharing, according to one embodiment.

FIG. 1 illustrates an exemplary system 100 for template-based multimedia authoring and sharing, according to one embodiment. System 100 includes computing device 102. Computing device 102 includes program module(s) 106 and program data 108. Program modules 106 include, for example, media library building module 110, media management and browsing module 112, media authoring module 114, content description and representation player 116, and other program modules 118. Media library building module 110 acquires or otherwise accesses input media 120 (e.g., original/unanalyzed input media), which is shown as a respective portion of media library 122. Input media 120 represents multimedia content such as video, photos, music, etc. Input media 120 is acquired from one or more data sources such as from local or remote databases, web sites, recording devices, etc.

Media library building module 110 analyzes the input media 120 to extract metadata (i.e., extracted metadata 124) to facilitate selective user application of corresponding media content to authoring templates: Content Description Templates (CDTs) 126 and Content Representation Templates (CRTs) 128. The media content analysis operations are configurable and extensible (e.g., via plug-ins) and include, for example, online and off-line media content filtering (parsing) operations. Examples of content filtering include shot detection, sub-shot detection, scene grouping, motion detection, key-frame extraction, histogram extraction, quality assessment, etc. The types of extracted metadata 124 are a function of the particular content filtering applied by media library building module 110. For purposes of exemplary description, input media 120 that has been parsed and/or filtered via content filtering operations to generate extracted metadata 124 is hereinafter often referred to as "analyzed input media". Exemplary media content analysis is described in greater detail below in the section titled "Media Content Analysis."

Media management and browsing module 112 provides a framework to allow a user to browse and visualize input media content. In one implementation, the framework provides a temporal structure and thumbnail based media browsing interface. This interface helps the user to find appropriate video segments and photo collections from analyzed input media 120, and thereby, facilitate media authoring operations.

Media authoring module 114 allows a user/editor to select one or more video clips and/or photos from analyzed input media 120 portion of the media library for placement onto a timeline to generate a storyline. Media authoring module 114 facilitates the placement operations in view of the information provided by extracted metadata 124. As described below, captions, credits, transitions and video effects may also be added to the selected media content. To facilitate these media content authoring operations, media authoring module 114 allows the user to select a CDT 126. The CDT 126 provides a temporal structure to the story line, along with composition methods, rules, and preferences within which the user can organize and edit select portions of analyzed input media 120 from media library 122, and thereby, generate authored content through a media authoring and sharing user interface (UI). (The media authoring and sharing UI is shown as a respective portion of "other data" 130). More particularly, each temporal unit in a CDT 126 is associated with a configurable editing method (or tool) and corresponding editing parameters (e.g., style, duration, incidental music, etc.) providing the user with substantial flexibility to manually or programmatically assign select portions of the analyzed input media 120 to the temporal structure.

These media content authoring operations, which have associated select portions of the analyzed input media 120 with the temporal structure of the CDT 126 to describe the authored content, result in a CDF 132. Exemplary aspects of CDTs 126 and CDFs 132 are described in greater detail below in the section titled "Content Description Template". The media authoring module 114 allows a user to select a CRT 128 to indicate how the authored content in the CDF 132 is to be rendered (a target rendering). More particularly, a CRT 128 specifies CDT authored content rendering criteria. Such criteria include, for example, information to render authored content to a DVD, a web site, as slides for presentation, has a file for playback and sharing, etc. Exemplary aspects of a CRT 128 are described in greater detail below in the section titled "Content Representation Template."

Media authoring module 114 combines the resulting CDF 132 with the selected CRT 128 to generate a content description and representation file (CDRF) 134 rendering (e.g., to a player 116, to a DVD, to a web site, as slides for presentation, etc.), sharing, and exporting, as described by the selected CRT 128. Exemplary aspects of a CDRF 134 are described in greater detail below in the section titled "CDRF and CDRF Player."

Figure 2:
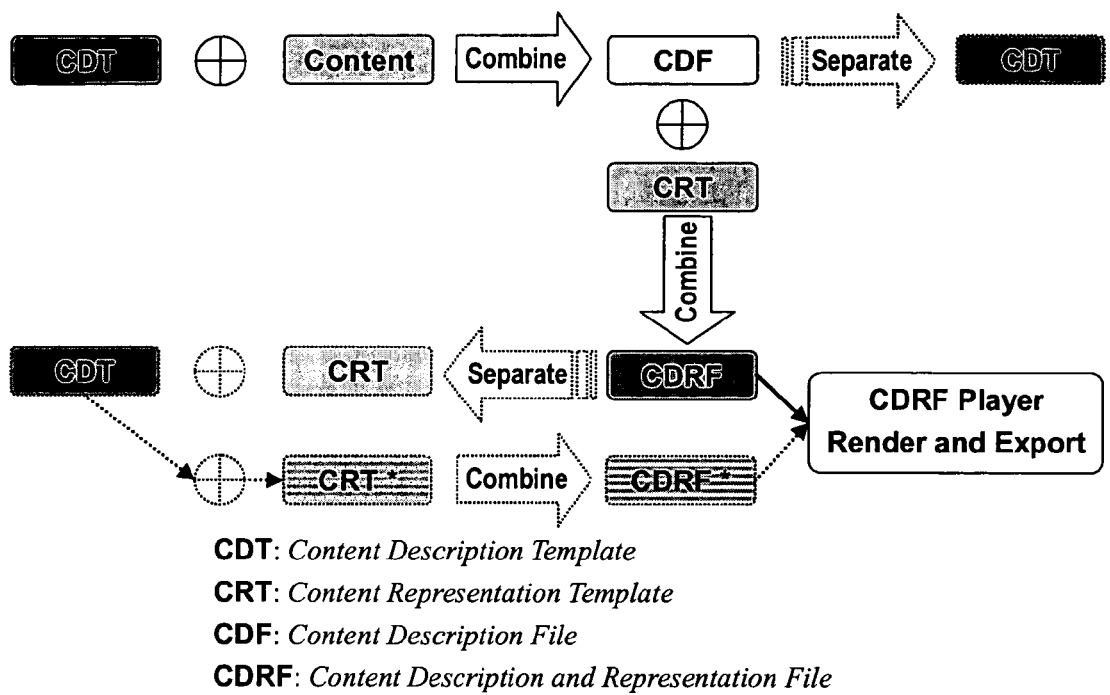
FIG. 2 shows exemplary relationships between Content Description Templates (CDTs), Content Representation Templates (CRTs), Content Description Files (CDFs), and Content Description and Representation Files (CDRFs), according to one embodiment.

FIG. 2 shows exemplary relationships between CDTs 126, CRTs 128, CDFs 132, and CDRFs 134, according to one embodiment. As shown in FIG. 2, a CDT 126 can be extracted from a CDF 132. Additionally, a CDT 126 and a CRT 128 can be extracted from a CDRF 134. Moreover, a CDT 126 and/or a CRT 128 in a CDF 132 and/or a CDRF 134 can be replaced with a different CDT 126 and/or CRT 128.

Media Content Analysis

In system 100 of FIG. 1, media content analysis algorithms are media content filters and/or media content parsers. For example, a shot detection filter is used for shot detection, and a histogram extraction filter is applied for extracting color histogram. There are two types of content filters: one is online filters, and the other one is offline filters. Online filters require parsing the entire video or audio stream, or photo files, to extract the corresponding basic metadata from the stream. While offline filters extract higher level metadata directly from these basic metadata without parsing the original media data. Examples of online filters include shot detection, timestamp extraction, and histogram extraction filters. Offline filters include scene detection, quality assessment filters, etc.

In this implementation, Extensible Markup Language (XML) is used to represent extracted metadata 124. If a new metadata is to be extracted, a new filter based on a filter template (e.g., a base C++ class) can be written and then plugged into the extensible and configurable architecture of system 100. For example, in one implementation, advanced users utilize a predefined online or offline base class, and then implement the real metadata extraction functions.

In this implementation, media library building module 110 supports one or more of video, photo, and music content filters. Video content filters include, for example, shot detection, sub-shot detection, scene grouping, motion detection, key-frame extraction, color histogram, attention detection, quality assessment, correlegram, video signature, face detection, and/or so on. Photo content filters include, for example, color histogram, static attention detection, quality assessment, correlegram, image signature, face detection, and/or so on. Music content filters include, for example, onset detection, beat detection, tempo detection, and/or so on.

Content Description Template

In this implementation a CDT 126 (FIG. 1) is described in XML. The basic unit of CDT is a "MSeg", which represents "Media Segment" (also called "slot" when it is rendered; please see FIG. 5). MSeg could be a chapter, a scene or a shot, or whatever temporal segment of a video. For a specific template, MSegs may be arranged hierarchically. All MSegs share the same definition and structure. The default settings for a child MSeg are inherited from its parent MSeg, while a child MSeg can have its own settings which have higher priority. A typical hierarchical structure could be "Chapter—Scene", which is similar to a general DVD content menu. In this paper, we will use this structure to present our idea.

In this implementation, a template contains the least one chapter (MSeg). A "chapter" may contain several "scenes" (also MSegs), while a "scene" can contain one or more smaller scenes, and so on.

Figure 3:
FIG. 3 shows an exemplary temporal structure of a CDT, according to one embodiment.

FIG. 3 shows an exemplary temporal structure of a Content Description Template, according to one embodiment. The temporal structure of this example represents the comprehensive shot list for a typical birthday party, including establishing, pre-party, guest arrival, meeting and greeting, environment, lighting candles, singing happy birthday, eating cake, giving and opening gifts, etc. This example includes six (6) chapters, including one leader chapter ("Introduction"), four body chapters ("Guests Arriving and Greeting", "The Party", "Guests Leaving and Giving Favors", and "Final Words of the Birthday Child"), and one tail chapter ("Closing"). Additionally, the second body chapter contains three scenes.

TABLE 1 shows an exemplary XML description of MSeg "Leader" in the above example of FIG. 3.

TABLE 1

EXEMPLARY XML DESCRIPTION OF AN MSeg

```
<MSeg level="1" mtype="Photo">
    <Title>Old Pictures</Title>
    <Duration fixed="false">60</Duration>
    <Method name=Photo2Video ver=1.0
    clsid="{BBBBBBBB-2dC1-4081-9BdB-20D7030234EF}">
        <param name="ChannelNum" value="1" />
        <param name="Style" value="Romantic Sepia" />
        <param name="SyncMusic" value="True" />
    </Method>
    <Music><clip src="abc.mp3" start="0" stop="120" mstart="0"
    /></Music>
</MSeg>
```

Referring to table 1, the source data of this MSeg is shown as a collection of photographs; the final duration of this segment is 60 seconds; the incidental music is "abc.mp3"; and the automatic editing method specifies a known "Photo2Video" computer-program application (e.g., a respective portion of "other program modules" 118 of FIG. 1). TABLE 2 shows an exemplary XML description of MSeg corresponding to "Chapter 2" of FIG. 3, which includes three child MSegs (C2S1 through C2S3).

TABLE 2

EXEMPLARY XML DESCRIPTION OF AN MSeg with 3 Sub-MSegs

```
<MSeg level="1" mtype="Phodeo">
    <Title>The Party</Title>
    <Duration fixed="false">600</Duration>
    <Method name="AVE" ver="1.0"
    clsid="{AAAAAAAA-2dC1-4081-9BdB-20D7030234EF}">
        <param name="ChannelNum" value="1" />
        <param name="Style" value="Music Video" />
        <param name="SyncMusic" value="true" />
    </Method>
    <MSeg level="2" mtype="Video">
        <Title>Candles and Song</Title>
        <Duration fixed="false">240</Duration>
        <Method name="AVE" ver="1.0"
        clsid="{AAAAAAAA-2dC1-4081-9BdB-20D7030234EF}">
            <param name="ChannelNum" value="1" />
            <param name="Style" value="Highlight" />
            <param name="SyncMusic" value="true" />
        </Method>
        <Music>
            <clip src="123.mp3" start="0" stop="201" mstart="0" />
            <clip src="456.mp3" start="201" stop="240" mstart="0" />
        </Music>
    </MSeg>
    <MSeg level="2" mtype="Video">
        <Title>Eating Cake</Title>
        <Duration fixed="true">180</Duration>
        <Music><clip src="123.mp3" start="1" stop="180"
        mstart="0"/></Music>
    </MSeg>
    <MSeg level="2" mtype="Video">
        <Title>Gifts</Title>
```

TABLE 2-continued

EXEMPLARY XML DESCRIPTION OF AN MSeg with 3 Sub-MSegs

```
        <Duration fixed="false">180</Duration>
        <Music><clip src="abc.mp3" start="0" stop="180"
        mstart="0"/></Music>
    </MSeg>
</MSeg>
```

Exemplary Content Description Template XML Syntax

Exemplary XML syntax for a CDT 126 is now described with respect to TABLES 3 through 6. Typically a CDT file 126 (FIG. 1) contains one root element which includes a sub-element called "CDTInfo", as well as a series of "flat" or hierarchical MSegs. CDTInfo provides the basic information of the CDT, including five basic sub-elements, as shown in TABLE 3.

TABLE 3

EXEMPLARY SUB-ELEMENTS OF "CDTInfo"

| Name | Description |
| --- | --- |
| title | The title/name of the CDT template. |
| author | The author of this template. |
| email | The email of the template author. |
| url | The URL of the relevant website. |
| Description | Description of the template. |

As described, MSeg is the basic element of a CDT 126. In this implementation, all MSegs share the same definition and structure. An MSeg has two primary attributes and four sub-elements, as listed in TABLES 4 the 5, respectively.

TABLE 4

EXEMPLARY ATTRIBUTES OF ELEMENT "MSeg"

| Name | Description |
| --- | --- |
| level | The structure level. The first level is "1". MSeg may contain multiple child MSegs, the level of a child MSeg is the level of its parent MSeg plus 1. |
| mtype | Specify media type of the source data. May be "Video", "Photo" or "Phodeo" (stands for Photo and Video). |

TABLE 5

EXEMPLARY SUB-ELEMENTS OF "MSeg"

| Name | Description |
| --- | --- |
| Title | The title of the MSeg, e.g., the caption of a chapter or a scene. |
| Duration | The desired duration of this MSeg in the output video. It has only one attribute called "fixed", which specifies whether the duration is fixed, or can be adjusted by the algorithm (<Method>). |
| Music | The incidental music for this MSeg. It is an optional element. The sub-elements of <Music> is <clip>, which is defined only as DirectShow Editing Services ® (DES); (src is the URL or path of the original raw videos/photos; start/stop means the start/stop |

TABLE 5-continued

EXEMPLARY SUB-ELEMENTS OF "MSeg"

| Name | Description |
| --- | --- |
|  | time in the output video segments, while mstart/mstop means the start/stop time of the original input source video clips). |
| Method | The method/algorithm that will be used to compose the output timeline of the corresponding slot from the raw media data specified by the users. It has three basic attributes as listed in TABLE 6, as well as a set of method-dependant parameters. |

TABLE 6 shows the attributes for the sub-element "Method" of "MSeg". This sub-element identifies the editing method that will be applied by media authoring module 114 (FIG. 1) to the raw media content (i.e., input media content) that is assigned by a user to this slot.

TABLE 6

EXEMPLARY SUB-ELEMENTS OF "MSeg"

| Name | Description |
| --- | --- |
| name | The name of the editing method, e.g., "AVE", which stands for the method of Automatic Video Editing. |
| ver | The version of the method. This attribute enables users to apply different versions of the same editing method at the same time (within one CDT). |
| clsid | The GUID (Globally Unique Identifier) of the method. GUID is the unique identification of a certain method. |

Editing Methods

The editing method portion of a CDT 126 indicates whether manual, automatic, or semi-automatic editing methods will be used to edit source media content in a slot of CDT 126. In one implementation, an automatic editing method such as AVE (e.g., the AutoMovie feature in MovieMaker), Photo2Video, etc., is used to automatically edit the source media content. If the editing method is manual editing, media authoring module 114 provides a manual editing UI (a respective portion of "other data" 130). The UI allows a user to cut and select particular video segments for dragging on to a timeline, as well as add transitions, effects, captions and incidental music manually. Depending on the particular editing method used, there will be a different set of editing parameters or preferences.

Figure 4:
FIG. 4 shows exemplary results of combining two source video streams by "patching" two video frames (one frame from each video) into one frame, according to one embodiment.

Referring TABLE 2, the ChannelNum parameter refers to the number of channels that raw media data will be fed in (by users). Typically the number is set to "1", while "2" or a higher value might be applied to generate fancier results. For example, two source video streams may be combined into one stream by "patching" two frames (one from each video) into one frame, as shown by FIG. 4. The Style parameter refers to desired editing style or preference. The "SyncMusic" parameter indicates whether media authoring module 114 will synchronize beat of a selected set of music content with extracted shot transitions. In one implementation, this parameter is set to "true" or "false".

Content Description Template UI Engine

Figure 5:
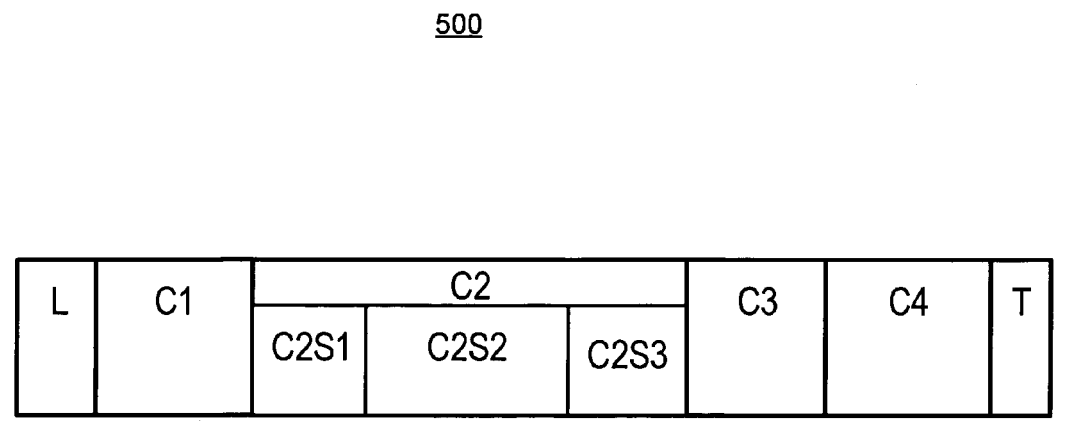

FIG. 5 shows an exemplary layout of a user interface 500 rendered by a content description template (CDT) UI engine, according to one embodiment. In this implementation, the CDT UI engine is implemented by media authoring module 114 of FIG. 1. For purposes of exemplary illustration, use of a CDT 126 for a birthday video is described to illustrate how the UI engine operates.

The UI engine of media authoring module 114 parses the hierarchical structure of a user selected CDT 126 (e.g., an XML file) to determine the structure of the CDT 126. Based on the structure, the UI engine generates and presents a user interface (e.g., interface 500) onto a display device (e.g., display device 136 of FIG. 1). To generate the user interface, the UI engine creates a set of lattices that correspond to the MSegs (e.g., L, C1, C2, C2S1, etc.) and the CDT as a timeline, as shown in the example of FIG. 5. The UI engine displays the titles of the slots (i.e. MSegs) in the corresponding lattices. The UI engine displays details of a particular slot (e.g., title, duration, method, etc.) responsive to user selection of the particular slot, or responsive to the slot obtaining focus in any other manner. A user can adjust these parameters (e.g. one or more of the duration, caption, editing method, etc.) for a certain MSeg in the presented detail window. The UI engine also supports, for example, the following operations: adding, deleting, copying, pasting, and/or moving slot operations.

Figure 6:
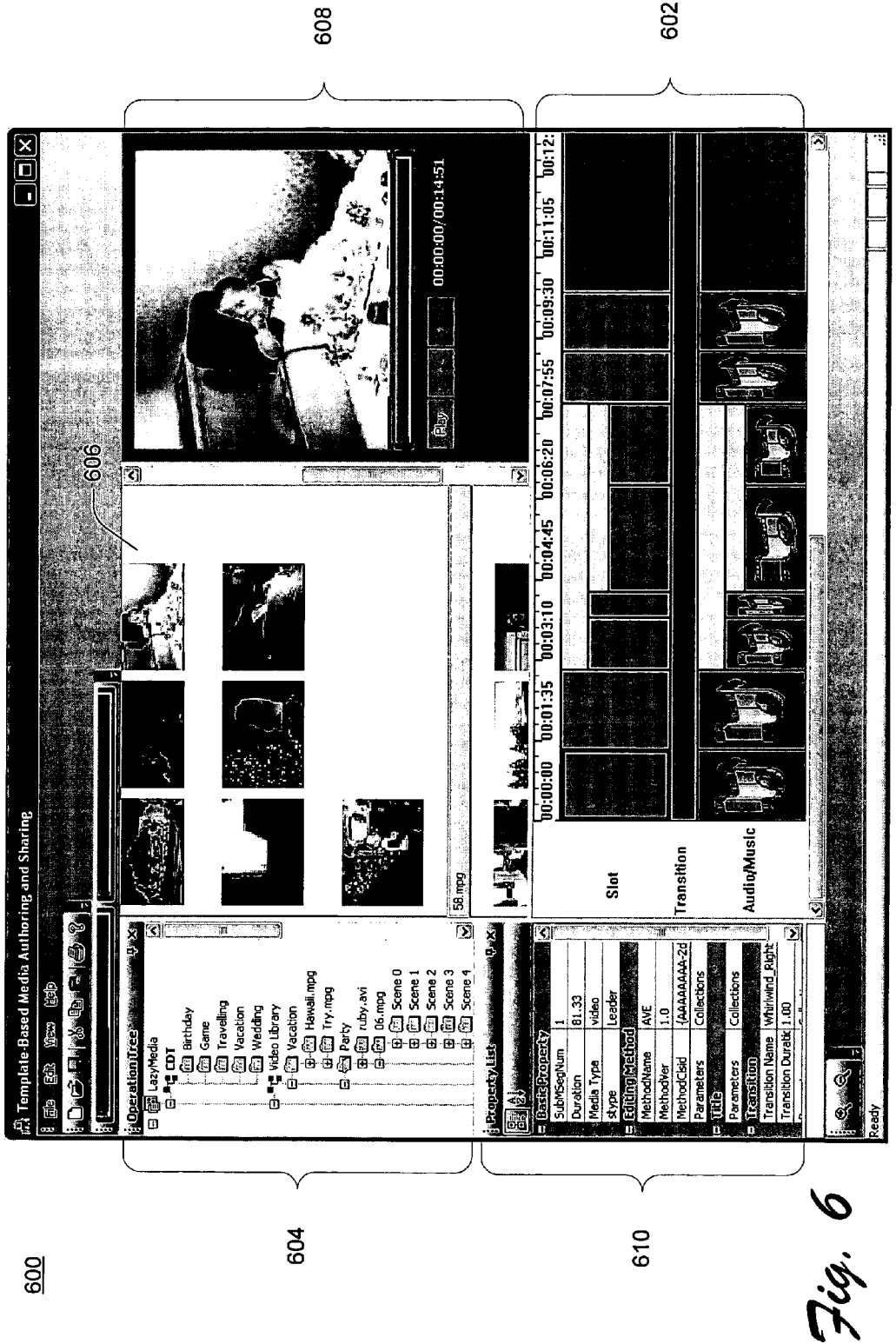
FIG. 6 shows an exemplary template-based media authoring user interface, according to one embodiment.

FIG. 6 shows an exemplary template-based media authoring UI 600, according to one embodiment. Referring to FIG. 6, area 602 represents the temporal and hierarchical structure of the user selected CDT 126. Area 604 shows a library tree. In this implementation, the library tree presents current input media content (e.g., video clips, images, music, etc.), CDTs 126, and CDFs 132 and a tree structure. Area 606 presents a library view, showing the details and content of a selected item in the library tree (e.g., thumbnails of scenes/shots in a video and/or photo collection, look-and-feel of a CDT 126 or CRT 128. Area 608 represents output from a Content Description Representation File (CDRF) player 116 (FIG. 1) to play source videos, images, CDRF files 134, etc. Area 610 is a property list showing detailed information/properties of any item(s) selected in the library view 606 or a selected slot in a CDT 126 displayed in CDT timeline display area 602.

Figure 7:
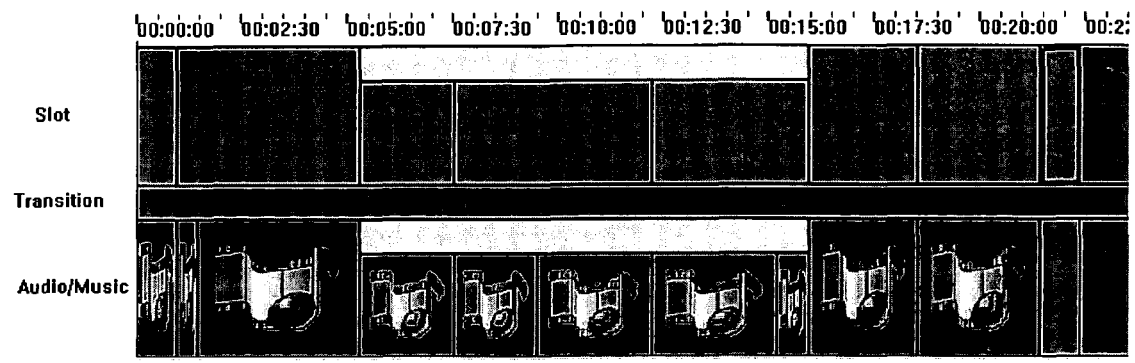
FIG. 7 shows an exemplary empty CDT before content has been added to the CDT to create a CDF, according to one embodiment.

FIG. 7 shows an exemplary empty Content Description Template (CDT) before content has been added to the CDT to create a Content Description File (CDF), according to one embodiment. Such a CDT 126 and a CDF 132 are shown in FIG. 1. Utilizing the template-based media authoring UI 600 of FIG. 6, a user can select or add raw video segments, still images, etc., into a specific slot of the CDT 126 by directly dragging the content from a presented media library (i.e., respectively represented by the library tree and library view areas 604 and 606) onto the corresponding CDT timeline slot. Responsive to a user dragging and dropping media into a CDT timeslot, the UI engine displays a thumbnail representing the content in the slot. For any slot requiring two or more input sequences, the slot is separated multiple parallel "lattices". For slots where the CDT 126 specifies manual editing, the UI engine presents an interface with media content editing tools to allow the user to manually edit and associate corresponding media content with the selected CDT timeline sequence. In this manner, the user interacts with the template-based media authoring UI 600 to specify portions of analyzed input media 120 to place into the temporal and hierarchical structure of a selected CDT 126.

Figure 8:
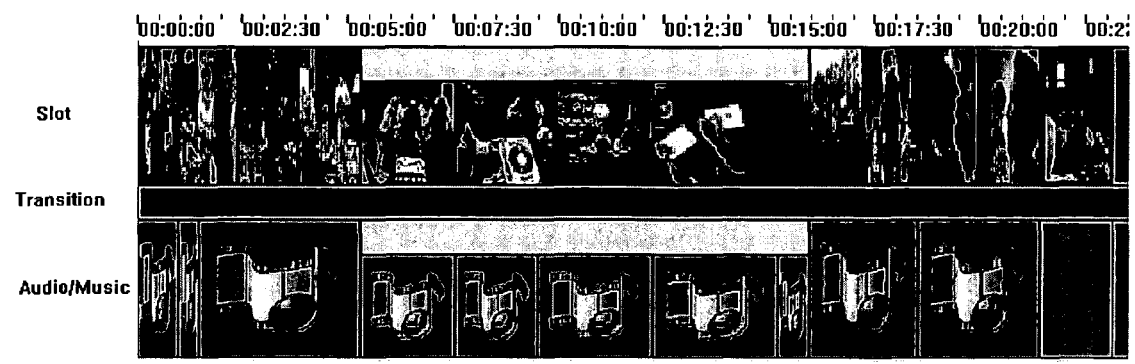
FIG. 8 shows an exemplary CDT after media content has been added to the template (creating a CDF), according to one embodiment.

FIG. 8 shows an exemplary Content Description Template after media content has been added to the template (creating a Content Description File), according to one embodiment.

Content Description File (CDT with Source Content)

Responsive to a user inputting raw media content into a certain CDT 126, media authoring module 114 generates a CDF 132. The CDF is in the same form as the CDT file, with the exception of several additional sub-elements: "CDFinfo", which has been added into the root element; and "Content", which has been added into element "MSeg". TABLE 7 shows an exemplary portion of a CDF 132 with "CDFInfo" and "Content."

TABLE 7

EXEMPLARY PORTION OF A CONTENT
DESCRIPTION FILE (CDF)

```
<CDFInfo>
    <Title>My Daughter's 8 Year's Old Birthday Party </Title>
    <Author>Tom</Author>
    <Affiliation>ABCD</Affiliation>
    <Email>abcd@abcd.com</Email>
    <URL>http://www.abcd.com/ </URL>
    <Description>This CDF XML file is for ...</Description>
</CDFInfo>
<MSeg level="2" mtype="Video">
        <Title>Candles and Song</Title>
        <Duration fixed="false">240</Duration>
        <Method name="AVE" ver="1.0"
        clsid="{AAAAAAAA-2dC1-4081-9BdB-20D7030234EF}">
            <param name="ChannelNum" value="1" />
            <param name="Style" value="Highlight" />
            <param name="SyncMusic" value="true" />
        </Method>
        <Music>
            <clip src="123.mp3" start="0" stop="201" mstart="0" />
            <clip src="456.mp3" start="201" stop="240" mstart="0" />
        </Music>
        <Content>
            <clip src="aaa.mpg" mstart="0" mstop="600" />
            <clip src="bbb.mpg" mstart="810" mstop="1020.5" />
        </Content>
</MSeg>
```

Referring to TABLE 7, there is shown references to two example source video clips (i.e., "aaa.mpg" and "bbb.mpg"), which are put into the MSeg. Additionally, as shown, the total duration of this exemplary source video is 810.5 seconds. As shown in this example, these two video clips will be passed to the specified editing method (e.g., "AVE") and the output video is 240 seconds.

Content Representation Templates (CRTs)

A CDF 132 provides a description of authored media content. In contrast to a CDF 132, a CRT 128 describes how the authored media content provided by the CDF 132 is to be represented or rendered. As described above, CRTs can be used to render authored contents in many forms, such as DVD, VCD, website, video file, slides, and so on. In this implementation, each type of CRT includes of three components: an XML template definition scheme, a template rendering engine, and a content composition (rendering) engine. The template rendering engine renders the look-and-feel of a CRT 128. The content composition (rendering) engine renders the authored content (CDRF 134) into DVD, VCD, etc. Similar to a CDT 126, a CRT 128 is an independent component of system 100. Media authoring module 114 exposes a uniform application programming interface (API) 138 for a user to design and develop new types of CRTs 128. A user can also modify an existing CRT and design a new CRT based on an existing CRT type.

Unlike CDTs 126, which have a uniform definition, CRT 128 definition depends on the type of the CRT 128. That is, different types of CRTs will have different definition schemes, rendering engines, and composition engines. (Such CRT rendering and composition engines are shown as respective portions of "other program modules" 118 of FIG. 1). For example, a DVD type CRT 128 includes an XML scheme to describe selected media content presentation look-and-feel, as well as parameters for the output DVD (e.g., a background image of the menu page, menu button styles, etc.). The CRT rendering engine displays the look-and-feel of a specific CRT 128, and the CRT content composition engine generates the corresponding CDRF file 134 and composes the authored content into DVD format (i.e., to render CDRF 134). Thus a DVD burning program burns selected media content (i.e., as defined by the corresponding CDF 132) directly to a DVD disc. Analogously, a simulated DVD software player plays selected media content.

In another example, a web site type CRT 128 includes, for example, an XML scheme to describe structure, layout, and format of the website. In this implementation, this description is similar to HTML language. Those CRT rendering engine of this example renders the look-and-feel of the web site type CRT. The corresponding composition engine generates the CDRF 134 as well as the actual website according to the specific CDF 132 and CRT 128. (For purposes of exemplary illustration, an exemplary networked environment for fully or partially implementing operations of computing device 102 is shown and described below in reference to FIG. 11).

In another example, a video type CRT 128 includes, for example, an XML scheme that defines transitions, effects and caption format of associated output video, a corresponding CRT rendering engine to display the appearance of a specific video CRT, and a corresponding CRT composition engine to generate the CDRF 134 and the final output video (shown as a respective portion of "other data" 130).

The Content Description Representation File
(CDRF) and Player

As shown in FIG. 2, a CDRF 134 of FIG. 1 is the combination of a CDF 126 and a CRT 128. TABLE 8 shows exemplary markup language for a CDRF 134.

TABLE 8

EXEMPLARY CONTENT DESCRIPTION
REPRESENTATION FILE

```
<?xml version="1.0" ?>
<CDRF>
    <CDRFInfo>
        <Title>My Daughter's 8 Year's Old Birthday Party</Title>
        <Author>Tom</Author>
        <Affiliation>ABCD</Affiliation>
        <Email>abcd@abcd.com</Email>
        <URL>http://www.abcd.com</URL>
        <Description>This CDF XML file is for ...</Description>
    </CDRFInfo>
    <CDF>
        ... // the content of the CDF is put here
    </CDF>
    <CRT>
        ... // the content of the CRT is put here
    </CRT>
</CDRF>
```

Referring to TABLE 8, the CDRF 134 is a description file that includes references to and corresponding representations. A CDRF 134 is used to directly generate final results (e.g., a DVD, a video, a web site, video playback, etc.). In this implementation, system 100 of FIG. 1 includes a CDRF player 116. In this implementation, certain portions of the logic implemented by the CDT parser, editing method plug-ins, CRT composition (rendering) engines are also linked into CDRF player 116. In this implementation, the CDRF player 116 generates an intermediate XML file similar to the XTL file format in DirectShow Editing Service®, which is a description of the final results but not the real content. According to the description file, the final result is created, for example, as a video stream in DVD format, an actual video file, etc. In this implementation, these description files are virtual video files and do not produce any actual video files.

Sharing and Exporting a CDRF

A CDRF 134 can be shared with others and exported into different CRT 128 types. With respect to sharing, for example, a CDRF 134 can be communicated to an entity using instant messaging software, or other communications software. Subsequent to receiving the shared CDRF 134, the entity opens the CDRF 134 using CDRF player 116 (FIG. 1) to play the edited content while corresponding raw media data is streamed to the player by a network connection. An exemplary network connection is described below in reference to FIG. 11.

To export authored media content from a CDF 132, a target CRT 128 is selected to create a corresponding CDRF 134. For example, to output authored media content from a CDF 132 to a video file, a video-type CRT 128 is selected and combined with the CDF 132 to create a corresponding CDRF 134. The corresponding CDRF 134 is used to directly render the authored media content to a video file, which can then be exported for example, in an MPEG-2 or MPEG-1 data format. In another example, if a website-type CRT 128 is selected, a corresponding CDRF 134 is generated from the CDF 132 and the website-type CRT 128. This CDRF 134 is then exported as a website. Each CRT 128 is independent of all other CRTs 128.

Figure 9:
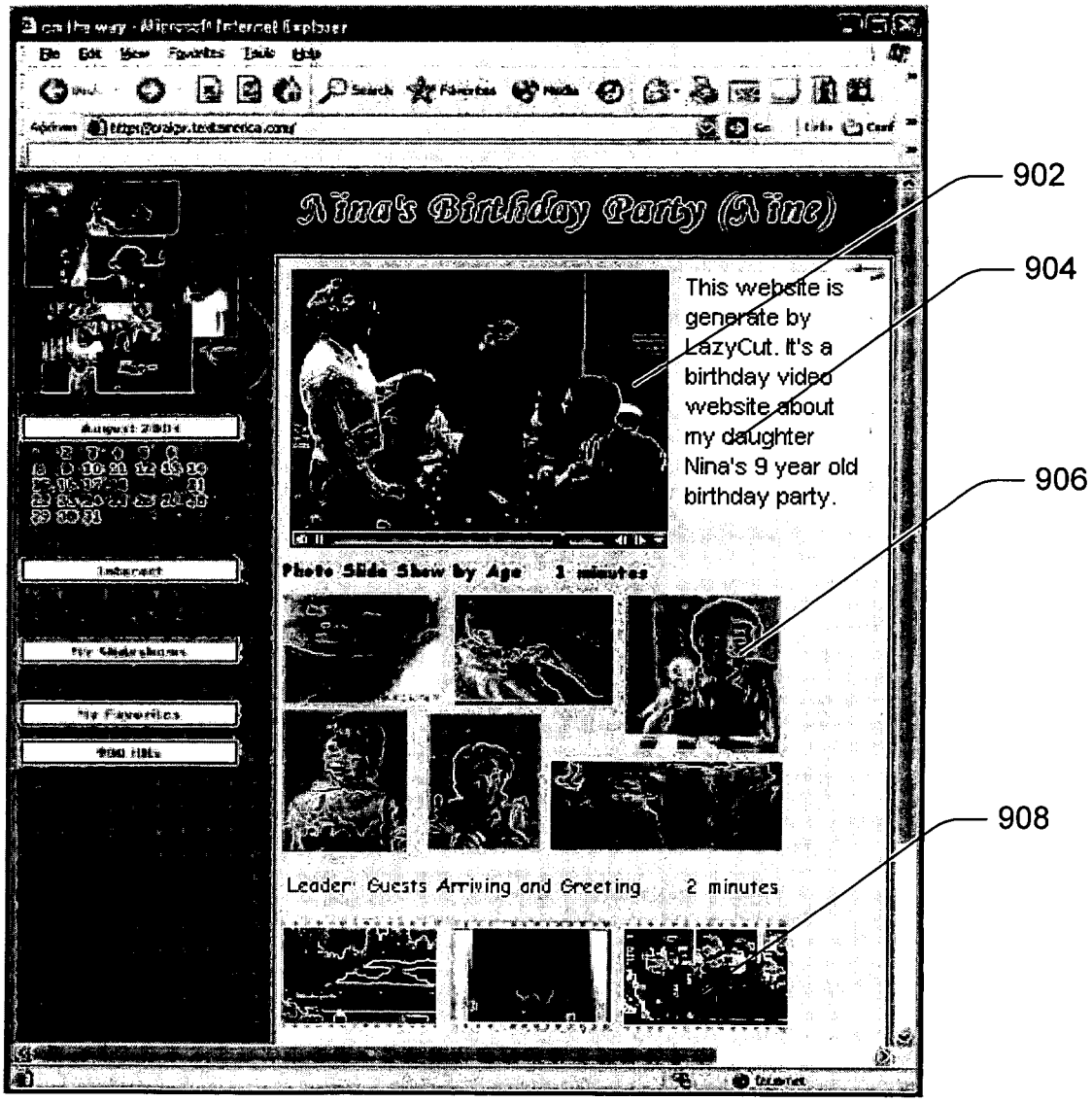
FIG. 9 shows an exemplary web site including exported media content from a CDRF based on a website-type CRT, according to one embodiment.

FIG. 9 shows an exemplary web site including exported media content from a Content Description Representation File, according to one embodiment. User interface (UI) area 902 shows exemplary output of CDRF player 116 of FIG. 1. UI area 904 shows exemplary description of the CDRF player output. UI area 906 shows exemplary still images or photos of the corresponding Content Description File 132. UI area 908 shows respective video chapters that will be played by the CDRF player responsive to user selection.

Open System

System 100 of FIG. 1 is an open and extensible system. For instance, a general user can modify and personalize existing templates (both CDTs 126 and CRTs 128) and create new templates based on existing editing methods and existing CRT types in the system. Additionally, an advanced user can use system 100 independent of MLB 110, MMB 112, and MA 114, to develop new editing methods, new content filters, and new types of CRTs 128. That is, in one implementation, one or more of a standalone (i.e. independent) CDT editor and a standalone CRT editor is provided. In addition to the CDT editing capabilities described above, the standalone CDT editor supports adding, deleting, copying, pasting, and moving a slot, as well as parameter tuning. A standalone CDT editor shares the same local and/or remote CDT library with the program modules of system 100. With respect to CRTs 128, the corresponding standalone editor provides a CRT editing interface for each type of CRT. Each CRT editing interface supports one or more of adding, deleting, copying, pasting, and moving a slot, parameter tuning, and/or other operations. New extensions can be compiled and packed into a self-installation package or a package imported by system 100 or corresponding template editors. Users sharing media content can download a package and install or import it into local system 100. After that, the new extensions are available to be used by system 100 template editors and the CDRF player 116.

In one implementation, system 100 implements a software development kit (SDK) enabling fast implementation of new content filters, editing methods and CRT schemes. Similar to the base classes defined for content filters discussed above, base classes for editing methods, CRT render engines, and CRT composition engines are well-defined in the SDK.

An Exemplary Procedure

Figure 10:
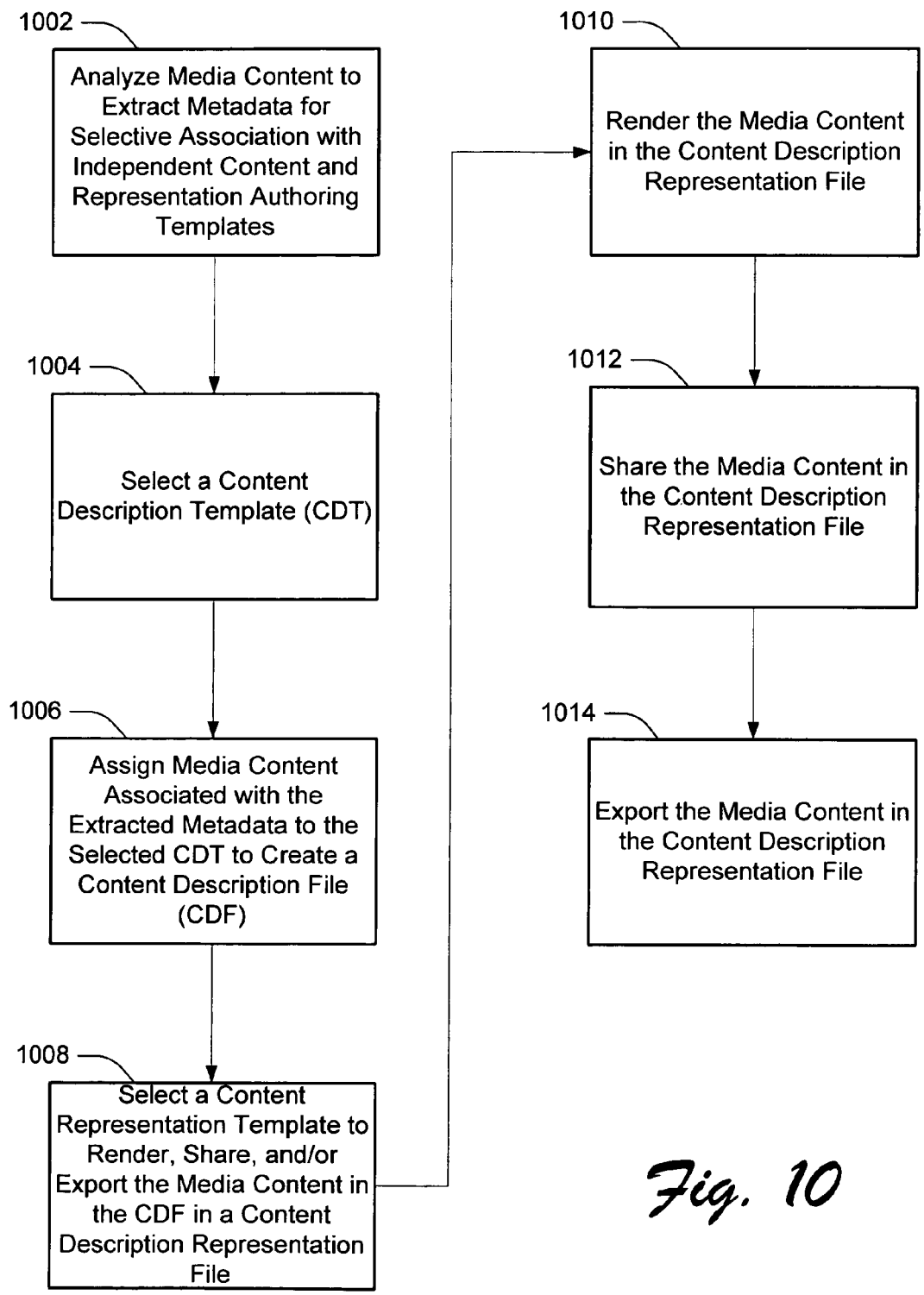
FIG. 10 shows an exemplary procedure for template-based multimedia authoring and sharing, according to one embodiment.

FIG. 10 shows an exemplary procedure for template-based multimedia authoring and sharing, according to one embodiment. For purposes of exemplary description and illustration, the operations of procedure 1000 are described in reference to the components of system 100 of FIG. 1. In this description, the leftmost numeral of a component reference number identifies the first figure in which the component is first described.

At block 1002, media library building module 110 (FIG. 1) analyzes input multimedia content to identify media content for selective association with independent content description templates 126 and content representation templates 128. At block 1004, a user selects a CDT 126 to generate a temporally based storyline with at least a portion of the identified media content. In one implementation, a user creates a new CDT 126, or modifies an existing CDT 126 with a CDT editor. In another implementation, the user selects the CDT 126 from a local or remote data source comprising a CDT template library. At block 1006, the user assigns at least a subset of the analyzed multimedia content (media content) to select slots in a temporal timeline defined by the selected CDT 126. The operations of block 1006 result in a CDF 132. At block 1008, the user selects a CRT 128 to facilitate rendering, sharing, and/or exporting the media content. This operation combines the CDF 132 with the selected CRT 128 to generate a content description and representation file (CDRF) 134.

At block 1010, content description and representation player 116 renders the CDRF 134. At block 1012, a user shares the media content in the CDRF 134 with another user for subsequent rendering, sharing, and/or exporting. At block 1014, a user exports the authored media content in the CDRF 134. Although procedure 1000 describes that media content associated with a CDRF 134 is rendered, shared, and exported, whether to user renders, shares, and/or exports media content associated with the CDRF 134 is arbitrary, being a function of the user's actions. Sharing and exporting are two possible (parallel) ways for users to export an edited media content result. A CDRF 134 can be shared and/or exported (in any order).

An Exemplary Operating Environment

Figure 11:
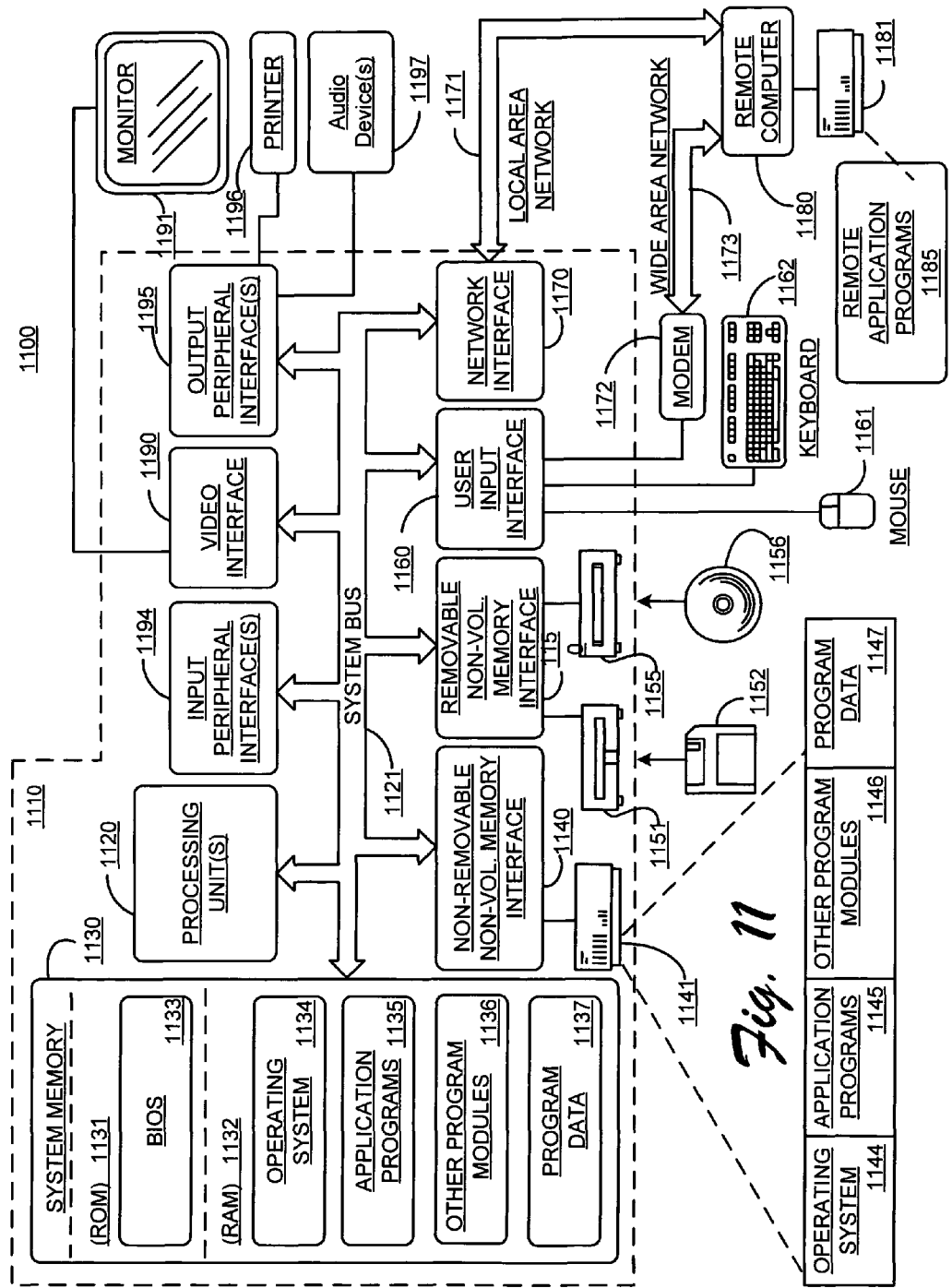
FIG. 11 illustrates an example of a suitable computing environment in which template-based multimedia authoring and sharing may be fully or partially implemented.

FIG. 11 illustrates an example of a suitable computing environment in which template-based multimedia authoring and sharing may be fully or partially implemented. Exemplary computing environment 1100 is only one example of a suitable computing environment for the exemplary system of FIG. 1 (as described above with respect to FIGS. 1 through 10) and is not intended to suggest any limitation as to the scope of use or functionality of systems and methods the described herein. Neither should computing environment 1100 be interpreted as having any dependency or requirement relating to any one or combination of components illustrated in computing environment 1100.

The methods and systems described herein are operational with numerous other general purpose or special purpose computing system, environments or configurations. Examples of well-known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention may be practiced in a distributed computing environment where tasks are performed by remote processing devices that are linked through a communications network. In a distributed computing environment, program modules may be located in both local and remote memory storage devices.

With reference to FIG. 11, an exemplary system for template-based multimedia authoring and sharing includes a general purpose computing device in the form of a computer 1110 implementing, for example, system 100 of FIG. 1. The following described aspects of computer 1110 are exemplary implementations of computing devices 102 of FIG. 1. Components of computer 1110 may include, but are not limited to, processing unit(s) 1120, a system memory 1130, and a system bus 1121 that couples various system components including the system memory to the processing unit 1120. The system bus 1121 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 1110 typically includes a variety of computer-readable media. Computer-readable media can be any available media that can be accessed by computer 1110 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1110.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or a direct-wired connection, and wireless media such as acoustic, RF, infrared and other wireless media. Combinations of the any of the above should also be included within the scope of computer-readable media.

System memory 1130 includes computer storage media in the form of volatile and/or nonvolatile memory such as read only memory (ROM) 1131 and random access memory (RAM) 1132. A basic input/output system 1133 (BIOS), containing the basic routines that help to transfer information between elements within computer 1110, such as during start-up, is typically stored in ROM 1131. RAM 1132 typically contains data and/or program modules that are immediately accessible to and/or presently being operated on by processing unit 1120. By way of example and not limitation, FIG. 11 illustrates operating system 1134, application programs 1135, other program modules 1136, and program data 1137.

The computer 1110 may also include other removable/non-removable, volatile/nonvolatile computer storage media. By way of example only, FIG. 11 illustrates a hard disk drive 1141 that reads from or writes to non-removable, nonvolatile magnetic media, a magnetic disk drive 1151 that reads from or writes to a removable, nonvolatile magnetic disk 1152, and an optical disk drive 1155 that reads from or writes to a removable, nonvolatile optical disk 1156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1141 is typically connected to the system bus 1121 through a non-removable memory interface such as interface 1140, and magnetic disk drive 1151 and optical disk drive 1155 are typically connected to the system bus 1121 by a removable memory interface, such as interface 1150.

The drives and their associated computer storage media discussed above and illustrated in FIG. 11, provide storage of computer-readable instructions, data structures, program modules and other data for the computer 1110. In FIG. 11, for example, hard disk drive 1141 is illustrated as storing operating system 1144, application programs 1145, other program modules 1146, and program data 1147. Note that these components can either be the same as or different from operating system 1134, application programs 1135, other program modules 1136, and program data 1137. Application programs 1135 includes, for example program modules of computing devices 102 or 104 of FIG. 1. Program data 1137 includes, for example, program data of computing devices 102 or 104 of FIG. 1. Operating system 1144, application programs 1145, other program modules 1146, and program data 1147 are given different numbers here to illustrate that they are at least different copies.

A user may enter commands and information into the computer 1110 through input devices such as a keyboard 1162 and pointing device 1161, commonly referred to as a mouse, trackball or touch pad. Other input devices (not shown) may include a microphone, joystick, game pad, satellite dish, scanner, or the like. These and other input devices are often connected to the processing unit 1120 through a user input interface 1160 that is coupled to the system bus 1121, but may be connected by other interface and bus structures, such as a parallel port, game port or a universal serial bus (USB).

A monitor 1191 or other type of display device is also connected to the system bus 1121 via an interface, such as a video interface 1190. In addition to the monitor, computers may also include other peripheral output devices such as printer 1196 and audio device(s) 1197, which may be connected through an output peripheral interface 1195.

The computer 1110 operates in a networked environment using logical connections to one or more remote computers, such as a remote computer 1180. In one implementation, remote computer 1180 represents computing device 102 or networked computer 104 of FIG. 1. The remote computer 1180 may be a personal computer, a server, a router, a network PC, a peer device or other common network node, and as a function of its particular implementation, may include many or all of the elements described above relative to the computer 1110, although only a memory storage device 1181 has been illustrated in FIG. 11. The logical connections depicted in FIG. 11 include a local area network (LAN) 1171 and a wide area network (WAN) 1173, but may also include other networks. Such networking environments are commonplace in offices, enterprise-wide computer networks, intranets and the Internet.

When used in a LAN networking environment, the computer 1110 is connected to the LAN 1171 through a network interface or adapter 1170. When used in a WAN networking environment, the computer 1110 typically includes a modem 1172 or other means for establishing communications over the WAN 1173, such as the Internet. The modem 1172, which may be internal or external, may be connected to the system bus 1121 via the user input interface 1160, or other appropriate mechanism. In a networked environment, program modules depicted relative to the computer 1110, or portions thereof, may be stored in the remote memory storage device. By way of example and not limitation, FIG. 11 illustrates remote application programs 1185 as residing on memory device 1181. The network connections shown are exemplary and other means of establishing a communications link between the computers may be used.

CONCLUSION

Although the systems and methods for template-based multimedia authoring and sharing have been described in language specific to structural features and/or methodological operations or actions, it is understood that the implementations defined in the appended claims are not necessarily limited to the specific features or actions described. Rather, the specific features and operations of system 100 are disclosed as exemplary forms of implementing the claimed subject matter.

The invention claimed is:

1. A computer-implemented method comprising:
   receiving raw media content;
   generating analyzed input media by parsing the raw media content, the parsing comprising an online filter that parses an entire stream of the raw media content to extract basic metadata and an offline filter that extracts additional metadata directly from the basic metadata without parsing the raw media content;
   applying the analyzed input media, based at least in part on the basic metadata and the additional metadata, to a content description template to author media in a content description, the content description template providing a temporal structure, composition methods, rules, and preferences for the analyzed input media; and
   applying, by a processing unit, a content representation template to the content description template, based at least in part on the basic metadata and the additional metadata, to specify output rendering criteria for the raw media content and generate a content description and representation, wherein the output rendering criteria specify output to a specific media, wherein the content description and representation provides for rendering, sharing, and exporting authored media content.

2. The method of claim 1, wherein the temporal structure represents one or more hierarchical storyline chapters and scenes.

3. The method of claim 1, wherein rendering criteria comprises specification of a target rendering, the target rendering comprising one or more rendering destinations of a DVD, a web site, slides, video, still images.

4. The method of claim 1, wherein the content description template, the content description, the content representation template, and the content description and representation are Extended Markup Language files.

5. The method of claim 1, wherein selectively applying further comprises selecting one or more of video, still images, and audio for placement into the temporal structure to generate a storyline.

6. The method of claim 1, wherein selectively applying further comprises displaying a media browsing interface for a user to assign respective portions of the media content to the temporal structure.

7. The method of claim 6, wherein displaying the media browsing interface includes displaying a set of lattices corresponding to respective segments of the temporal structure, each lattice representing a respective portion of the media content.

8. The method of claim 1, further comprising selecting one or more of the content description template and the content representation template from respective local or remote template libraries.

9. The method of claim 1, further comprising adding one or more of a caption, a credit, a transition, and a video effect to media content assigned to one or more portions of the temporal structure.

10. The method of claim 1, further comprising creating one or more of the content description template and the content representation template.

11. The method of claim 1, further comprising one or more of rendering and sharing media content associated with the content description and representation.

12. The method of claim 1, further comprising exporting authored media content associated with a first content representation template to a target representation associated with a second content representation template, the first content representation template not being the same as the second content representation template.

13. A computer-implemented method comprising:
    filtering multimedia content using a multimedia filtering device to identify media content appropriate for both a content description template and a user-modifiable content representation template, the filtering comprising using each of an online filter and an offline filter, wherein the online filter filters the multimedia content by parsing the multimedia content, and wherein the online filter comprises:
    a shot detection filter to detect shot boundaries,
    a timestamp extraction filter, and
    a histogram extraction filter to extract a color histogram; and
    wherein the offline filter filters the multimedia content without parsing the multimedia content to extract additional metadata directly;
    selectively applying the identified media content to the content description template to author media in a content description, the content description template providing a temporal structure for the identified media content, the content description template being associated with one or more of an editing method and corresponding editing parameters, a rule, and a preference within which a user can organize and edit the identified media content with respect to the temporal structure;
    applying, by a processing unit, the user-modifiable content representation template to the content description to specify rendering representation criteria for the identified media content and to generate a content description and representation, the content representation template comprising:

an XML template definition scheme, a template rendering engine, and a content rendering engine, wherein the content rendering engine renders the identified media content according to the specified representation criteria, and wherein the specified representation criteria specify output to a website; and wherein the content description and representation provides for rendering, sharing, and exporting authored media content.

14. The method of claim 13, wherein selectively applying further comprises displaying a media browsing interface for a user to assign respective portions of the media content to the temporal structure.

15. The method of claim 13, further comprising providing one or more independent template editors to create the content description template and the content representation template.

16. The method of claim 13, further comprising one or more of rendering, sharing, and exporting media content associated with the content description and representation.

17. The method of claim 1, wherein the online filter comprises at least one of a shot detection filter, a timestamp extraction filter, or a histogram extraction filter.

18. The method of claim 1, wherein the offline filter comprises at least one of a scene detection filter or a quality assessment filter.

19. The method of claim 7, wherein the content description template for one of the sets of lattices is inherited from a parent lattice.

20. Computer-readable storage media storing computer-readable instructions that direct a template-based-multimedia authoring and sharing device to perform acts comprising:

selectively applying media content to a content description template to author media in a content description, the content description template providing a temporal structure for the media content and being associated with one or more of an editing method and corresponding editing parameters, a rule, and a preference within which a user can organize and edit the media content with respect to the temporal structure, wherein the content description template and the content description are Extended Markup Language (XML) files;

displaying a media browsing interface that includes a set of lattices corresponding to respective portions of the media content, each lattice representing a respective portion of the media content, the media browsing interface for a user to assign the respective portions of the media content to the temporal structure;

applying, by a processing unit, a content representation template to the content description template to specify output rendering criteria for the media content and generate a content description and representation, wherein the output rendering criteria specify output to a specific media, wherein the content description and representation provides for rendering, sharing, and exporting authored media content, wherein the content representation template, and the content description and representation are XML files;

filtering multimedia content to identify the media content appropriate for one or both of the content description template and the content representation template, the filtering comprising one or more video, photo, and music content filtering operations and further comprising using each of (i) an online filter comprising a shot detection filter to detect shot boundaries, a timestamp extraction filter, and a histogram extraction filter to extract a color histogram and (ii) an offline filter that filters the multimedia content without parsing the multimedia content to extract additional metadata directly; and exporting authored media content associated with a first content representation template to a target representation associated with a second content representation template, the first content representation template not being the same as the second content representation template.

* * * * *